US006818293B1

(12) United States Patent
Keep et al.

(10) Patent No.: US 6,818,293 B1
(45) Date of Patent: Nov. 16, 2004

(54) STABILIZED POLYESTER FIBERS AND FILMS

(75) Inventors: Gerald Timothy Keep, Kingsport, TN (US); William Alston Haile, Kingsport, TN (US); Mark Elliott Tincher, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 15 days.

(21) Appl. No.: 10/422,306

(22) Filed: Apr. 24, 2003

(51) Int. Cl.$^7$ .............................. D02G 3/00; C08F 20/00
(52) U.S. Cl. .................. 428/359; 528/295; 528/298; 528/302; 528/306; 528/307; 528/308; 528/308.6; 525/438; 524/126; 524/128; 428/364; 428/373
(58) Field of Search .............................. 528/295, 298, 528/302, 306, 307, 308, 308.6; 525/438; 524/126, 128; 428/359, 364, 373

(56) References Cited

U.S. PATENT DOCUMENTS

| | | |
|---|---|---|
| 3,051,212 A | 8/1962 | Daniels |
| 3,193,522 A | 7/1965 | Neumann et al. |
| 3,193,523 A | 7/1965 | Neumann et al. |
| 3,560,605 A | 2/1971 | Siggel et al. |
| 3,589,956 A | 6/1971 | Kranz et al. |
| 3,627,867 A | 12/1971 | Schwarz |
| 3,657,191 A | 4/1972 | Titzmann et al. |
| 3,673,144 A | 6/1972 | Weissermel et al. |
| 3,869,427 A | 3/1975 | Meschke et al. |
| 3,975,329 A | 8/1976 | Barnewell et al. |
| 4,016,142 A | 4/1977 | Alexander et al. |
| 4,115,350 A | 9/1978 | Lazarus et al. |
| 4,130,541 A | 12/1978 | Lazarus et al. |
| 4,130,601 A | 12/1978 | Ohoka et al. |
| 4,139,521 A | 2/1979 | Lazarus et al. |
| 4,222,928 A | 9/1980 | Kawamura et al. |
| 4,308,195 A | 12/1981 | Mayer et al. |
| 4,310,658 A | 1/1982 | Lazarus et al. |
| 4,348,500 A | 9/1982 | Robeson et al. |
| 4,374,960 A | 2/1983 | Rothwell et al. |
| 4,529,779 A | 7/1985 | Arai et al. |
| 4,879,328 A | 11/1989 | Karasawa et al. |
| 5,169,499 A | 12/1992 | Eagles et al. |
| 5,428,086 A | 6/1995 | Minnick et al. |
| 5,596,049 A * | 1/1997 | Gallucci et al. ............ 525/438 |
| 5,607,757 A | 3/1997 | Dalton |
| 5,981,062 A | 11/1999 | Stroud, Jr. et al. |
| 6,132,868 A | 10/2000 | Dean et al. |

FOREIGN PATENT DOCUMENTS

| | | |
|---|---|---|
| CH | 601 391 | 12/1977 |
| EP | 0 273 149 A2 | 6/1988 |
| GB | 1 601 585 | 11/1981 |
| JP | 54-43258 | 4/1979 |
| JP | 54-131695 | 10/1979 |
| JP | 55-12871 | 1/1980 |
| JP | 57-161124 | 10/1982 |
| JP | 59-163479 | 9/1984 |
| JP | 61-36009 | 8/1986 |
| JP | 7-166419 | 6/1995 |
| JP | 8-208965 | 8/1996 |
| JP | 2002-69777 | 3/2002 |
| JP | 2002-115121 | 4/2002 |

* cited by examiner

*Primary Examiner*—Samuel A. Acquah
(74) *Attorney, Agent, or Firm*—Eric D. Middlemas; Bernard J. Graves, Jr.

(57) ABSTRACT

Disclosed are fibers and films prepared from polyesters of a dicarboxylic acid, preferably terephthalic acid, and a diol selected from 1,3-cyclohexanedimethanol, 1,4-cyclohexanedimethanol, or 1,3-propanediol. The fibers and films contain a multifunctional epoxide additive and, optionally, an antioxidant, and show an increased dry heat stability when exposed to elevated temperatures in the presence of air while preserving excellent hydrolytic stability. Also disclosed is a process for stabilizing polyester fibers by melt blending a polyester and epoxide additive and melt spinning. The fibers and films are particularly useful in applications requiring elevated temperatures.

31 Claims, No Drawings

STABILIZED POLYESTER FIBERS AND FILMS

FIELD OF THE INVENTION

The present invention pertains to fibers and films prepared from polyesters of a dicarboxylic acid and a diol selected from 1,3-cyclohexanedimethanol, 1,4-cyclohexanedimethanol, or 1,3-propanediol. The fibers and films contain an epoxide additive and, optionally, an antioxidant, and show an increased dry heat stability when exposed to elevated temperatures in the presence of air. The fibers and films are particularly useful in applications requiring elevated temperatures.

BACKGROUND OF THE INVENTION

Polyester materials are widely used as extrusion and molding resins for applications such as fibers, films, automotive parts, food packaging, beverage containers, and the like. Commonly used polyesters include poly(ethylene terephthalate), herein abbreviated as "PET", poly(1,4-butylene terephthalate), herein abbreviated as "PBT", poly(1,3-propylene terephthalate), herein abbreviated as "PTT", and poly(1,4-cyclohexylenedimethylene terephthalate), herein abbreviated as "PCT". PET polymers are widely used because of their availability and modest price. PET polymers have relatively good heat resistance in dry conditions but tend to degrade readily under moist conditions at elevated temperatures. Similarly, PET fibers, yarns, and fabrics are known to exhibit excellent dimensional stability, that is, low shrinkage or growth during service. Although PET has a high resistance to thermal degradation, PET fibers can exhibit loss of tensile strength under continuous exposure to elevated temperatures. Because of these limitations, PET polymers have limited usefulness in certain durable and semi-durable applications which require elevated temperatures, such as, for example, paper making machine clothing, dryer felts, industrial belts, high temperature tape backing, filter media for hot air or liquid filtration, autoclavable products, and other applications involving extended exposure to steam or superheated steam.

Efforts to remedy this problem have been directed to producing a high molecular weight linear polyester having a low content of free carboxyl groups. One approach is to reduce the number of free carboxyls by the use of "end-capping agents", such as diazomethane, as disclosed by U.S. Pat. No. 3,051,212, or carbodiimides, as disclosed by U.S. Pat. Nos. 3,975,329 and 5,169,499, which react with the free carboxyl groups and thereby prevent their further reaction. These end-capping materials, however, are expensive, often toxic, and thus not suitable for commercial applications.

Polyester compositions containing epoxides are known (see, for example, U.S. Pat. Nos. 3,657,191; 3,627,867; 3,869,427; 4,016,142; 4,130,541; 4,115,350; 3,560,605; 4,374,960; and Japanese Kokai Patent Nos. 07166419; 55012871; and 54131695. The addition of epoxides to polyesters, however, can be problematic. For example, the epoxides may show a low reactivity which, in turn, can create processing and operational difficulties and give uncertain results. For example, U.S. Pat. No. 3,869,427 discloses that styrene oxide appears to increase the level of carboxyl groups when added to molten PET and that diepoxides are "unsuitable for the formation of fibers". Various polyester blends and composites in combination with epoxides also are described, for example in U.S. Pat. Nos. 4,348,500 and 4,222,928. Such blends, however, are expensive and can require complicated processing. In addition, reinforced polymer composites are not suitable for the preparation of fibers. Thus, the compositions described in the above references do not adequately address the inherent susceptibility of PET to hydrolysis or provide compositions which show excellent stability to high temperatures under both dry and moist conditions.

In contrast to PET, polyester polymers based on poly(1,4-cyclohexylene-dimethylene terephthalate), i.e., "PCT", have excellent high temperature hydrolytic stability, are essentially free of cyclic trimers and surface oligomers, and are well suited for filtration applications. PCT fibers have an inherent advantages, with melting points (abbreviated herein as "Tm") up to 290° C., glass transition temperatures (abbreviated herein as "Tg") up to 90° C., high resiliency, and softness in comparison with other polyester fibers. PCT polymers, however, are susceptible to oxidation and tend to degrade when heated at high temperatures in the presence of air. Although PCT polymers containing epoxides and antioxidants for molding and reinforced compositions also are known (see, for example, Minnick et al. in U.S. Pat. No. 5,428,086), the deficiencies of PCT polymers in dry-heat stability for fiber and film applications have not been addressed. We have now discovered that fibers and films prepared from PCT and PTT homo- and copolyesters melt-blended with multifunctional epoxides show excellent stability at elevated temperatures in the presence of air and under both moist and dry conditions. Our discovery is unexpected because fibers and films prepared from PET melt-blended with multifunctional epoxides show no improvement, and sometimes, a reduction in both dry and wet stability at elevated temperatures.

SUMMARY OF THE INVENTION

It has been found that certain polyester blends containing selected epoxide compounds and, optionally, antioxidants, such as hindered phenols and/or phosphites, have excellent elevated temperature stability in fiber and film form under both dry and moist conditions. Accordingly the present invention provides a polyester fiber comprising:

i) dicarboxylic acid residues comprising about 60 to 100 mole % of a first dicarboxylic acid residue selected from the group consisting of terephthalic acid, naphthalenedicarboxylic acids, cyclohexanedicarboxylic acids, and mixtures thereof; and from 0 to about 40% of a second dicarboxylic acid residue selected from the group consisting of aromatic dicarboxylic acids containing from about 8 to about 16 carbon atoms, aliphatic dicarboxylic acids containing from about 4 to about 16 carbon atoms, cycloaliphatic dicarboxylic acids containing from about 6 to about 16 carbon atoms, and mixtures thereof;

ii) diol residues comprising about 50 to 100 mole % of a first diol residue selected from the group consisting of 1,3-cyclohexanedimethanol, 1,4-cyclohexanedimethanol, 1,3-propanediol, and mixtures thereof, and from 0 to about 50 mole % of a second diol residue selected from the group consisting of aliphatic diols containing from 2 to about 16 carbon atoms, cycloaliphatic diols containing from about 6 to about 16 carbon atoms, and mixtures thereof; and iii) about 0.05 weight % (wt %) to about 5 wt %, based on the total weight of said polyester, of an epoxide additive comprising an epoxide compound with at least 2 epoxy groups per molecule.

The fiber compositions may take any of the following forms, namely monofilaments, multifilaments, tows, staple or cut fibers, staple yarns, cords, woven, tufted and knitted fabrics, nonwoven fabrics, including melt blown fabrics and spunbond fabrics, and multilayer nonwovens, laminates, and composites from such fibers. Because of their good resistance to degradation at elevated temperatures, our novel stabilized fibers are useful in dryer felts and other paper machine clothing, belting, filter media for hot air or hot liquid filtration, electrical, autoclavable, sterizable products, and other industrial applications.

The instant invention also provides stabilized polyester films. Thus, another embodiment of our invention is polyester film comprising:

i) a polyester comprising about 60 to 100 mole % of a dicarboxylic acid residue selected from the group consisting of terephthalic acid, naphthalenedicarboxylic acids, cyclohexanedicarboxylic acids, and mixtures thereof; about 50 to: 100 mole % of a diol residue selected from the group consisting of 1,3-cyclohexanedimethanol, 1,4-cyclohexanedimethanol, 1,3-propanediol, and mixtures thereof; and ii) about 0.05 weight % (wt %) to about 5 wt %, based on the total weight of said polyester, of an epoxide additive comprising an epoxide compound with at least 2 epoxy groups per molecule.

These films are useful for food, industrial, and medical packaging used under high temperature conditions, including membranes and supports for bioculture media.

Our invention also provides a process for stabilizing polyester fibers comprising:

i) melt blending a) a polyester comprising about 60 to 100 mole % of a dicarboxylic acid residue selected from the group consisting of terephthalic acid, naphthalenedicarboxylic acids, cyclohexanedicarboxylic acids, and mixtures thereof; about 50 to 100 mole % of a diol residue selected from the group consisting of 1,3-cyclohexanedimethanol, 1,4-cyclohexanedimethanol, 1,3-propanediol, and mixtures thereof; b) about 0.05 wt % to about 5 wt %, based on the total weight of said polyester, of an epoxide additive comprising a epoxide compound with at least 2 epoxy groups per molecule; and ii) melt spinning continuous strands of filaments.

The present invention thus provides polyester fibers and films with increased stability at elevated temperatures under both moist and dry conditions and in the presence of air. Our novel fibers and films may contain from 0 weight % to about 6 weight % (abbreviated hereinafter as "wt %"), based on the total weight of the polyester, of a hindered phenol, phosphorus-containing, or sulfur-containing antioxidant to provide additional stability. Our invention may be used to prepare a range of fiber types including monofilament, multifilament, yarns, bicomponent fibers, spunbond fabrics, and melt blown webs. The fibers may be readily produced in a range of sizes from about 2 micrometers (also referred to herein as "microns" and abbreviated as "$\mu$m") in melt blown webs, about 0.5 to about 50 d/f for staple fibers, and up to about 5000 d/f for monofilament. The fibers of our invention may also be used in crimped and uncrimped form. Our novel fibers and films thus solve many of the known dry heat and hydrolytic stability problems encountered with PET and other polyester materials and provide longer lived, more economical products.

DETAILED DESCRIPTION

The present invention provides polyester fiber and films which show increased dry heat and hydrolytic stability in the presence of air at elevated temperatures. In a general embodiment, our invention provides polyester fiber and films comprising i) dicarboxylic acid residues comprising about 60 to 100 mole % of a first dicarboxylic acid residue selected from the group consisting of terephthalic acid, naphthalenedicarboxylic acids, cyclohexanedicarboxylic acids, and mixtures thereof; a second dicarboxylic acid residue from 0 to about 40% of a second dicarboxylic acid residue selected from the group consisting of aromatic dicarboxylic acids containing from about 8 to about 16 carbon atoms, aliphatic dicarboxylic acids containing from about 4 to about 16 carbon atoms, cycloaliphatic dicarboxylic acids containing from about 6 to about 16 carbon atoms, and mixtures thereof; ii) diol residues comprising from about 50 to 100 mole % of a first diol residue selected from the group consisting of 1,3-cyclohexanedimethanol, 1,4-cyclohexanedimethanol, 1,3-propanediol, and mixtures thereof; from 0 to about 50 mole % of a second diol residue selected from the group consisting of aliphatic diols containing from 2 to about 16 carbon atoms, cycloaliphatic diols containing from about 6 to about 16 carbon atoms, and mixtures thereof; and iii) about 0.05 weight % (wt %) to about 5 wt %, based on the total weight of the polyester, of an epoxide additive comprising a epoxide compound or mixture of epoxide compounds with at least 2 epoxy groups per molecule. The fibers and films optionally may contain up to about 6 weight %, based on the total weight of the polyester, of a hindered phenol, phosphorus-containing, or sulfur-containing antioxidant to provide additional stability. The fiber compositions may take any of the following forms, namely monofilaments, multifilaments, tows, staple fibers, yarns, cords, woven knitted and tufted fabrics, nonwoven fabrics, melt-blown fabrics, spunbonded fabrics, composites, and laminates. Because of their high temperature resistance, the stabilized fibers are useful in industrial applications such a dryer felts of paper making machines, steamer belts, filters for hot air and hot liquid filtration, electrical motor housing, "breather fabrics" used in the production of vacuum bonded structural composites, high temperature insulation, and food processing under elevated temperatures. Similarly, the stabilized films of the present invention are useful for packaging applications, membranes, and as supports for biomaterials, air purification media, and chromatography. The term "degradation", as used herein, mean a loss of inherent viscosity and tensile strength of the polymer over time as a result of exposure to high temperature with or without moisture present. Thus, terms such as "high temperature resistance", "heat stability", "temperature stability", "resistance to degradation", etc., refer to polymer, fiber, and film compositions that show a reduced loss of inherent viscosity or tensile strength over similar compositions at elevated temperatures, with or without moisture or air present. By the term "elevated temperatures", as used herein, it is meant temperatures in the range of 80 to 210° C. Representative temperatures within this range where our novel fibers show increased temperature stability are 126° C., 148° C. and 205° C.

The fibers and films of the present invention comprise polyesters prepared from dicarboxylic and diol residues. The term "polyester", as used herein, encompasses both "homopolyesters" and "copolyesters" and means a synthetic polymer prepared by the polycondensation of dicarboxylic acids with dihydric alcohols. The term "residue", as used herein, means any repeating organic structure incorporated into the polymer through a polycondensation reaction. Thus, the dicarboxylic acid residue may be derived from a dicarboxylic acid or its associated esters, salts, anhydrides, or mixtures thereof. As used herein, therefore, the term dicarboxylic acid is intended to include dicarboxylic acids and any derivative of a dicarboxylic acid, including its associated esters, half-esters, salts, half-salts, anhydrides, mixed anhydrides, or mixtures thereof, useful in a polycondensation process with a diol to make a high molecular weight polyester. One or more dicarboxylic residues may be used. The dicarboxylic acid component, a total of 100 mole %, may comprise about 60 to 100 mole % of a first dicarboxylic acid residue from the residues of terephthalic acid, naphthalenedicarboxylic acids, cyclohexanedicarboxylic acids, or mixtures thereof. Preferably the first dicarboxylic acid residue will comprise about 80 to 100 mole % and, more preferably, from about 90 to 100 mole % of the dicarboxylic acid residues. Examples of naphthalenedicarboxylic acids with may be used in our invention include 1,2-naphthalenedicarboxylic acid, 1,3-naphthalenedicarboxylic acid, 1,4-naphthalenedicarboxylic acid, 1,5-naphthalenedicarboxylic acid, 1,6-naphthalenedicarboxylic acid, 2,4-naphthalenedicarboxylic acid, 2,5-naphthalenedicarboxylic acid, 2,6-naphthalenedicarboxylic acid, 2,7-naphthalenedicarboxylic acid, 2,8-naphthalenedicarboxylic acid, their associated esters, or mixtures thereof. The preferred naphthalenedicarboxylic acid is 2,6-naphthalenedicarboxylic acid. Examples of cyclohexanedicarboxylic acids are 1,2-cyclohexanedicarboxylic acid, 1,3-cyclohexanedicarboxylic acid, and 1,4-cyclohexanedicarboxylic acid. The preferred cyclohexanedicarboxylic acid is 1,4-cyclohexanedicarboxylic acid. The cycloaliphatic acids, for example, 1,3- and 1,4-cyclohexanedicarboxylic acids, may be present as their pure cis or trans isomers or as a mixture of cis and trans isomers. The preferred first dicarboxylic acid residue is terephthalic acid.

The first dicarboxylic acid residue may be modified with from 0 to about 40 mole % of a second dicarboxylic acid residue comprising residues from aromatic dicarboxylic acids containing from about 8 to about 16 carbon atoms, aliphatic dicarboxylic acids containing about 4 to about 16 carbon atoms, cycloaliphatic dicarboxylic acids containing from about 6 to about 16 carbon atoms, or mixtures thereof. Non-limiting examples of modifying dicarboxylic acids are fumaric, succinic, adipic, glutaric, azelaic, sebacic, isophthalic, resorcinoldiacetic, 1,2-cyclobutanedicarboxylic acid, 1,3-cyclobutanedicarboxylic acid, 2,2,4,4-tetramethyl-1,3-cyclobutanedicarboyxlic acid, 1,3-cyclopentanedicarboxylic acid, diglycolic, 4,4'-oxybis[benzoic], biphenyldicarboxylic, 4,4'-methylenedibenzoic, trans-4,4'-stilbenedicarboxylic, and sulfoisophthalic acids. A preferred second dicarboxylic acid residue is from isophthalic acid.

The diol residues comprise about 50 to 100 mole % of a first diol residue selected from 1,3-cyclohexanedimethanol, 1,4-cyclohexanedimethanol, 1,3-propanediol, and mixtures thereof; and from 0 to about 50 mole % of a second diol residue selected from aliphatic diols containing from 2 to about 16 carbon atoms, cycloaliphatic diols containing from about 6 to about 16 carbon atoms, and mixtures thereof. Preferably, the first diol residue may comprise about 70 to 100 mole % or, more preferably, from about 90 to 100 mole % of the diol residues. The cycloaliphatic diols, for example, 1,3- and 1,4-cyclohexanedimethanol, may be present as their pure cis or trans isomers or as a mixture of cis and trans isomers. As used herein, the term "diol" is synonymous with the term "glycol" and means any dihydric alcohol. The preferred first diol residue is from 1,4-cyclohexanedimethanol. Non-limiting examples of second diol residue are residues from ethylene glycol, neopentyl glycol, 1,3-propanediol, 1,4-butanediol, 1,5-pentanediol, 1,6-hexanediol, 2,2-dimethyl-1,3-propanediol, 1,8-octanediol, 1,10-decanediol, diethylene glycol, and 2,2,4,4-tetramethyl-1,3-cyclobutanediol. The preferred diols residues are from neopentyl glycol, 1,3-propanediol, and 1,6-hexanediol with ethylene glycol being most preferred.

The polyester is stabilized by the addition of about 0.05 weight % (abbreviated herein as "wt %") to about 5 wt %, based on the total weight of the polyester, of an epoxide additive comprising a epoxide compound or mixture of epoxide compounds with at least 2 epoxy groups per molecule. A representative concentration of epoxide additive is from about 0.05 wt % to about 2 wt %. More preferably, the concentration of epoxide additive is from about 0.1 to about 1 wt %, and most preferably, from about 0.2 to about 0.5 wt %. The epoxide additive may be any epoxide compound containing at least 2 epoxy groups but it is preferable that the epoxide additive have low volatility under melt processing or polymerization conditions of temperature and pressure. The terms "epoxide", "epoxide compound", "epoxide additive", "epoxy compound", and "glycidyl compound" as used herein, mean any organic compound, mixtures of organic compounds, polymers, or oligomers containing 1 or more oxirane rings and is intended to encompass compositions or formulations containing epoxide compounds or mixtures of epoxide compounds. The preferred epoxide additives contain compounds with at least 2 epoxy groups per molecule and preferably 3 or more epoxy groups. Preferably, the epoxide additive is selected from aromatic hydrocarbon monomers having at least 2 epoxide groups, oligomers and polymers of from 2 to 100 monomer units and having at least 2 epoxide groups, and mixtures thereof. For example, the epoxide compound may contain a plurality of 1,2-epoxide groups derived from the reaction of a polyfunctional active hydrogen containing compound with an excess of an epihalohydrin under basic conditions. When the active hydrogen compound is a polyhydric alcohol or phenol, the resulting epoxide composition contains glycidyl ether groups. A preferred group of polyglycidyl compounds are made via condensation reactions with 2,2-bis-(4-hydroxyphenyl)propane, also known as bisphenol A, and have structures (I–III) such as the following:

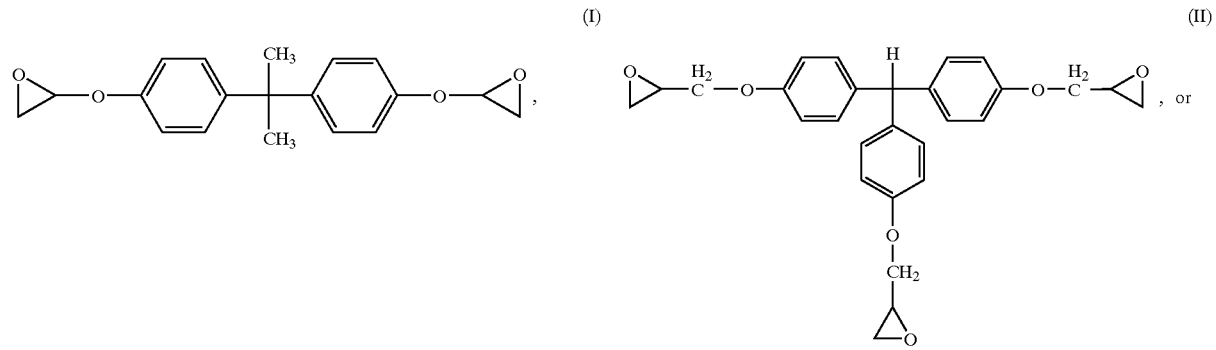

-continued

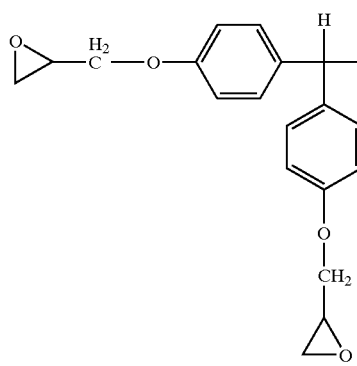 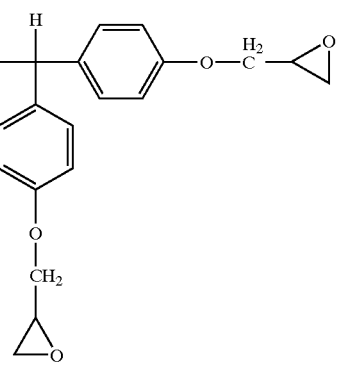

(III)

Oligomers or polymers incorporating structures (I–III) as monomers are also preferred as epoxide additives. The preferred epoxide additives may also comprise bisphenol A epoxy resins, i.e., oligomers or polymers having the formula (IV):

Many suitable polyglycidyl compounds are available commercially. In addition to the bisphenol A epoxy resins mentioned above, these include 1,4-butanediol diglycidyl ether (e.g., "Araldite RD-2" from Ciba-Geigy Corporation), polyglycidyl ethers of phenolformaldehyde novolak (e. g. ,

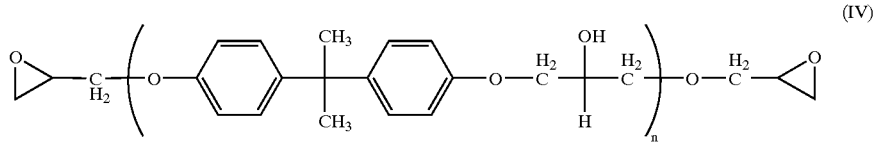

(IV)

wherein n is 2 to about 100. Many of these epoxide additives are commercially available, for example "DER 331", "DER 332", "DER 334", and "XD9053.03" (Epoxy D in the examples, a trifunctional aromatic epoxy with molecular weight 460) from Dow Chemical Company (or, more recently, from Ciba-Geigy); and "Epon 828," "Epon 1004", "Epon 1010", and "Epon 1001F" (Epoxy B in the examples, a difunctional long chain epoxy compound supplied by Shell Chemical Co).

Other polyfunctional active hydrogen compounds can be used to make polyglycidyl adducts suitable for use in the practice of this invention. These include amines, amino alcohols and polycarboxylic acids. Adducts derived from amines and amino phenols include N,N-diglycidyl propylaniline, N,N,N',N'-tetraglycidyl-4,4'-diaminodiphenyl methane, N,N,N-triglycidyl-4-aminophenol or N,N'-dimethyl-N,N'-diglycidyl 4,4'-diaminodiphenylmethane. Polyepoxides which are polyglycidyl esters of 4,4'-dihydroxy diphenyl methane, 4,4' dihydroxy diphenyl sulfone or tris(4-hydroxyphenyl)methane are useful in this invention.

Glycidyl esters of carboxylic acids may be used also in the present invention. Such glycidyl esters include, for example, diglycidyl phthalate and diglycidyl adipate. Polyepoxides prepared from polyols such as pentaerythritol, glycerol, butanediol or trimethylol propane and an epihalohydrin are also useful. In addition, polyepoxides such as triglycidyl cyanurates and isocyanurates, N,N-diglycidyl oxamides, N,N'-glycidyl derivatives of hydantoins, diglycidyl esters of cycloaliphatic dicarboxylic acids, and polyglycidyl thioethers of polythiols are useful.

Other epoxy-containing materials are copolymers of acrylic acid esters of glycidol such as glycidyl acrylate and glycidyl methacrylate with one or more copolymerizable vinyl compounds. Examples of such copolymers are 1:1 styrene-glycidyl methacrylate, 1:1 methylmethacrylate-glycidyl acrylate and 62.5:24:13.5 methylmethacrylate: ethyl acrylate: glycidyl methacrylate.

"DENA31" and "DEN-438" from Dow Chemical Co.), polyglycidyl ethers of a cresol-formaldehyde novolak resin (e.g., "Araldite® ECN 1299", referred to as "Epoxy A" in the examples), and "ECN-1273" (each from Ciba-Geigy Corporation), N,N'-diglycidyl derivative of dimethyl hydantion (e.g., "XB-2793" from Ciba Geigy Corporation), resorcinol diglycidyl ether (e.g., "Kopoxite" from Koppers Co., Inc), and a methylolated bisphenol A epoxy resin (e.g., "Apogen 101" made by Schaefer Chemical Co.). Preferred epoxide additives are polyglycidyl ethers of a phenol-formaldehyde novolac resin, polyglycidyl ethers of a cresol-formaldehyde novolak resin (e.g., "Araldite® ECN 1299"), tris(4-gylcidyloxypheny)methane, oligomers thereof, or polymers thereof, with polyglycidyl ethers of a cresol-formaldehyde novolak resin being particularly preferred.

Our novel polyester fibers or films may optionally contain up to about 6 wt %, based on the total weight of the polyester, of hindered phenol, phosphorus-containing, or sulfur-containing antioxidants, many of which are commercially available. For example, one suitable hindered phenol is tetrakis[methylene 3-(3', 5'-di-tert-butyl-4'-hydroxyphenyl)propionate]methane, sold as Irganox® 1010 antioxidant by Ciba-Geigy. Other hindered phenols useful in the present invention include 1,3,5-tris(3,5-di-tert-butyl-4-hydroxybenzyl)-5-triazine-2,4,6-(1H, 3H, 5H)trione; 3,5-di-tert-butyl-4-hydroxyhydrocinnamic acid triester with 1,3,5-tris(2-hydroxyethyl)-S-triazine-2,4,6-(1H, 3H, 5H)-trione; octadecyl 3,5-di-tert-butyl4-hydroxyhydrocinnamate; thiodiethylene bis(3,5-di-tert-butyl-4hydroxy) hydrocinnamate; N,N'-hexamethylene bis(3,5-di-tert-butyl-4-hydroxy-hydrocinnamamide); 1,6-hexamethylene bis(3,5-di-tert-butyl-4-hydroxyhydrocinnamate); 1,3,5,-trimethyl-2, 4,6,-tris(3,5-di-tert-butyl-4-hydroxybenzyl)benzene; 2,4-bis (n-octylthio)-6-(4hydroxy-3,5-di-tert-butylanilino-1,3,5-triazine; n-octadecyl 3,5-di-terbutyl)-4-hydroxyphenylacetate; 1,3,5-tris(4-tert-butyl-3-hydroxy-2, 6-dimethylbenzyl)-1,3,5-triazine-2,4,6-(1H, 3H, 5H)trione;

2,2'-methylenebis(4-ethyl-6-tert-butylphenol); 2,2'-methylenebis(4-methyl-6-tert-butylphenol); 4,4-methylenebis(2,6-di-tert-butylphenol); 4,4-thiobis(6-tert-butyl-o-cresol); 3:1 condensate of 3-methyl-6-tert-butylphenol and crotonaldehyde; 4,4'-butyldienebis(6-tert-butyl-m-cresol)-3,5-di-tert-butyl-4-hydroxybenzyl ether; 2,2'-oxamido-bis(ethyl-3-(3,5-di-tert-butyl4-hydroxyphenyl)propionate; stearyl β-(3,5-di-tert-butyl-4-hydroxyphenyl)propionate; distearyl 3-methyl-4-hydroxy-5-tert-butylbenzyl malonate; 4,4'-propylmethylenebis(2-tert-butyl-5-methylphenol); 2,2'-propylmethylenebis(4,6-dimethylphenol); 2,2'-methylene-bis(4,6'-di-tert-butylphenol); 1,4-bis(3',5'-di-tert-butyl-4'-hydroxybenzyl)-2,3,5,6-tetramethylbenzene; 1,1-bis(3'-cyclohexyl-4'-hydroxyphenyl)cyclohexane; 2,6-bis(2'-hydroxy-3'-tert-butyl-5'-methylphenyl)-4-methylphenol; 2,4,6-tris((β(3',5'-hydroxyphenyl)ethyl)-1,3,5-triazine; and 2,4,6-tris(3',5'-di-tert-butyl-4'-hydroxybenzyl)phenol.

The phosphorus-containing antioxidants may be either a phosphite or a phosphonite. Examples of such materials are "Ultltranox 626" phosphite, "Ultranox 633" phosphite, (General Electric Chemicals), "Irgafos 168" phosphite (Ciba-Geigy Corporation), 2,2'-ethylidenebis(4,6-di-tert-butylphenyl)fluorophosphite ("Ethanox 398" phosphite, Albemarle Corporation), 2,2'-Ethylidenebis(4,6-di-tert-butylphenyl)fluorophosphonite ("Ethanox 398" phosphonite, Albemarle Corporation), "Sandostab P-EPQ" phosphonite (Sandoz Chemicals), and a combination of distearyl or dilauryl thiodipropionate with 1,3,5-dimethyl-2,4,6-tris(3,5-tert-butyl-4-hydroxybenzyl)benzene ("Ethanox 330", available from Albemarle Corporation). For the present invention, representative concentrations of antioxidants are from 0 to about 6 wt % and from about 0.1 to about 4 wt %. Preferably, these antioxidants are present at concentrations ranging from about 0.1 to about 2 wt %, more preferably from about 0.2 to about 1 wt %, and most preferably from about 0.2 to about 0.5 wt % based on the total weight of the polyester.

A preferred embodiment of the present invention is a polyester fiber comprising: i) dicarboxylic acid residues comprising about 60 to 100 mole % of terephthalic acid and from 0 to about 40% of isophthalic acid; ii) diol residues comprising about 50 to 100 mole % of a first diol residue comprising 1,4-cyclohexanedimethanol; and from 0 to about 50 mole % of a second diol residue comprising aliphatic diols containing from 2 to about 16 carbon atoms; and iii) about 0.05 wt % to about 2 wt %, based on the total weight of the polyester, of an epoxide additive comprising a epoxide compound with at least 2 epoxy groups per molecule. The polyester preferably has a glass transition temperature ("Tg") of greater than or equal to 85° C. Preferably, the first diol residue may comprise about 70 to 100 mole % or, more preferably, from about 90 to 100 mole % of the diol residues. The concentration of epoxy compound may be from about 0.1 to about I wt % or, preferably, from about 0.2 to about 0.5 wt %. The polyester fiber may contain from 0 wt % to about 6 wt % of an antioxidant based on the total weight of the polyester. If an antioxidant is used, it typically comprises about 0.1 to about 2 wt % or, more typically, about 0.2 to about 1 wt % of the total weight of the polyester fiber. Most preferably, the antioxidant comprises about 0.5 wt % of a hindered phenol and about 0.5 wt % of a phosphite or phosphonite. More preferably, the dicarboxylic acid residues comprise from about 90 to 100 mole % terephthalic acid and from about 0 to about 10 mole % isophthalic acid; the diol residues comprise about 100 mole % 1,4-cyclohexanedimethanol thereof; and the epoxide additive comprises about 0.5 wt % of a polyglycidyl ether of a cresol-formaldehyde novolac resin. Most preferably, the dicarboxylic acid residue comprises about 95 mole % terephthalic acid and about 5 mole % isophthalic acid, and the epoxide additive comprises about 0.5 wt % of a polyglycidyl ether of a cresolformaldehyde novolac resin.

The polyester fiber may also comprise a dicarboxylic acid residue comprising about 100 mole % terephthalic acid and a diol residue comprising about 100 mole % 1,4-cyclohexanedimethanol, or mixtures thereof. The polyester is melt blended with about 0.05 wt % to about 2 wt %, based on the total weight of the polyester, of an epoxide additive comprising a epoxide compound or mixture of epoxide compounds with at least 2 epoxy groups per molecule and, optionally, from 0 wt % to about 6 wt % of an antioxidant based on the total weight of the polyester, and continuous strands of filaments are melt spun from the blend. The polyester preferably has a glass transition temperature ("Tg") of greater than or equal to 85° C. The concentration of epoxy compound may be from about 0.1 to about 1 wt % or, preferably, from about 0.2 to about 0.5 wt %. Most preferably, the epoxide additive comprises about 0.5 wt % of a polyglycidyl ether of a cresol-formaldehyde novolac resin. If an antioxidant is used, it typically comprises about 0.1 to about 2 wt % or, more typically, about 0.2 to about 1 wt % of the total weight of the polyester. Preferably, the antioxidant comprises about 0.5 wt % of a hindered phenol and about 0.5 wt % of a phosphite or phosphonite.

For the purposes of this invention, the term "fiber" refers to a shaped polymeric body of high aspect ratio capable of being formed into two or three dimensional articles such as woven or nonwoven fabrics. The term "polyester fiber" means fibers prepared from polyester polymers that may include the various antioxidants, pigments, and additives described herein. In addition, fiber refers to filaments that may take any of the various forms well known to persons skilled in the art, namely monofilaments, multifilaments, tows, staple or cut fibers, staple yarns, cords, woven, tufted, and knitted fabrics, nonwoven fabrics, including melt blown fabrics and spunbond fabrics, and multilayer nonwovens, laminates, and composites from such fibers. Most fiber forms are heatset. The fibers of the present invention may be a mono filament, multifilament, or bicomponent fiber. Our novel fibers may be produced as a staple, yarn, cord, or a direct spun, nonwoven fabric.

The monofilament fibers generally range in size from about 20 to about 8000 denier per filament (abbreviated herein as "d/f") and are particularly useful in paper machine clothing applications. The preferred fibers will have d/f values in the range of about 500 to about 5000. Such monofilaments may be in the form of unicomponent or bicomponent fibers. Bicomponent fibers may have sheath/core, side by side, or other configurations known to persons skilled in the art. Other multicomponent configurations are also possible. The process of preparing bicomponent fibers also is well known and is described in U.S. Pat. No. 3,589,956. In a bicomponent fiber, the stabilized polyester fibers of this invention will be present in amounts of about 10 to about 90 wt. % and will generally be used in the sheath portion of sheath/core fibers. The other component may be from a wide range of other polymeric materials including but not limited to polyesters such as PET, PBT, PTT, polylactides and the like as well as polyolefins, cellulose esters, and polyamides. Side by side combinations with significant differences in thermal shrinkage can be utilized for the development of a spiral crimp. If crimping is desired, a saw tooth or stuffer box crimp is generally suitable for many applications. If the second polyester is in the core of a sheath/core configuration, such a core optionally may be stabilized.

The multifilament fibers of our invention will preferably range in size from about 2 micrometers for melt blown webs, about 0.5 to about 50 d/f for staple fibers, and up to about 5000 d/f for monofilament fibers. Multifilament fibers may also be used as crimped or uncrimped yarns and tows. Fibers used in melt spun and melt blown web fabric may be produced in microdenier sizes.

The polyesters of the instant invention are readily prepared from the appropriate dibasic acids, esters, anhydrides, or salts, and the appropriate diol or diol mixtures using typical polycondensation reaction conditions. They may be made by continuous, semi-continuous, and batch modes of operation and may utilize a variety of reactor types. Examples of suitable reactor types include, but are not limited to, stirred tank, continuous stirred tank, slurry, tubular, wiped-film, falling film, or extrusion reactors. The term "continuous" as used herein means a process wherein reactants are introduced and products withdrawn simultaneously in an uninterrupted manner. By "continuous" it is meant that the process is substantially or completely continuous in operation and is to be contrasted with a "batch" process. "Continuous" is not meant in any way to prohibit normal interruptions in the continuity of the process due to, for example, start-up, reactor maintenance, or scheduled shut down periods. The term "batch" process as used herein means a process wherein all the reactants are added to the reactor and then processed according to a predetermined course of reaction during which no material is fed or removed into the reactor. The term "semicontinuous" means a process where some of the reactants are charged at the beginning of the process and the remaining reactants are fed continuously as the reaction progresses. Alternatively, a semicontinuous process may also include a process similar to a batch process in which all the reactants are added at the beginning of the process except that one or more of the products are removed continuously as the reaction progresses. The process is operated advantageously as a continuous process for economic reasons and to produce superior coloration of the polymer as the polyester may deteriorate in appearance if allowed to reside in a reactor at an elevated temperature for too long a duration.

In forming the polyesters of the invention, the reaction of the diol component and the dicarboxylic acid component may be carried out using conventional polyester polymerization conditions. For example, when preparing the polyesters and copolyesters by means of an ester interchange reaction, i.e., from the ester form of the dicarboxylic acid components, the reaction process may comprise two steps. In the first step, the diol component and the dicarboxylic acid component, such as, for example, dimethyl terephthalate, are reacted at elevated temperatures, typically, about 180° C. to about 280° C. at pressures ranging from about 0.0 kPa gauge to about 414 kPa gauge (60 pounds per square inch, "psig"). Preferably, the temperature for the ester interchange reaction ranges from about 190° C. to about 240° C. while the preferred pressure ranges from about 103 kPa gauge (15 psig) to about 276 kPa gauge (40 psig). Thereafter, the reaction product is heated under higher temperatures and under reduced pressure to form polyester with the elimination of diol, which is readily volatilized under these conditions and removed from the system. This second step, or polycondensation step, is continued under higher vacuum and a temperature which generally ranges from about 240° C. to about 300° C., preferably about 250° C. to about 290° C. and most preferably about 270° C. to about 285° C., until a polymer having the desired degree of polymerization, as determined by inherent viscosity, abbreviated herein as "I.V." is obtained. The polycondensation step may be conducted under reduced pressure which ranges from about 53 kPa (400 torr) to about 0.013 kPa (0.1 torr). The presence of a suitable catalyst greatly increases the rate of the above reactions.

To ensure that the reaction of the diol component and dicarboxylic acid component by an ester interchange reaction mechanism is driven to completion, it is preferred to employ 3 moles and more preferably about 2.3 to about 2.6 moles of diol component to one mole dicarboxylic acid component. Persons of skill in the art will understand, however, that the ratio of diol component to dicarboxylic acid component is generally determined by the design of the reactor in which the reaction process occurs.

In the preparation of polyester by direct esterification, i.e., from the acid form of the dicarboxylic acid component, copolyesters are produced by reacting the dicarboxylic acid or a mixture of dicarboxylic acids with the diol component or a mixture of diol components. The reaction is conducted at a pressure of from about 7 kPa gauge (1 psig) to about 1379 kPa gauge (200 psig), preferably less than 689 kPa (100 psig) to produce a low molecular weight, linear or branched polyester product having an average degree of polymerization of from about 1.4 to about 10. The temperatures employed during the direct esterification reaction typically range from about 1 80° C. to about 280° C., more preferably ranging from about 220° C. to about 270° C. This low molecular weight polymer may then be polymerized by a polycondensation reaction.

To ensure that the reaction of the diol component and dicarboxylic acid component by a direct esterification reaction mechanism is driven to completion, it is preferred to employ about 3.0 to about 10.5 moles diol component to one mole dicarboxylic acid component. Persons of skill in the art will understand, however, that the ratio of diol component to dicarboxylic acid component will be determined by the design of the reactor in which the reaction process occurs.

Lower I.V. copolyesters are generally obtained by employing shorter residence times or slow reaction rates as compared to processes for forming higher I.V. copolyesters. For example, the reaction rate can be slowed by reducing the reaction temperature, reducing the catalyst concentration, by increasing the absolute pressure in the reactor, or by a combination of these factors.

A variety of catalyst systems are useful in promoting the reaction of the diol component and the dicarboxylic acid component. Typically a catalyst system will contain one or more catalysts and catalyst inhibitors. Well known catalysts include, but are not limited to, compounds containing titanium, manganese, zinc, cobalt, antimony, gallium, lithium, calcium, silicon, and germanium. Generally, the catalyst comprises compounds which contain titanium, manganese and/or zinc and mixtures thereof. While the amounts of the individual catalysts in the catalyst system will vary, it is desired that the total amount of catalyst in the catalyst system be below about 125 ppm, preferably below about 100 ppm and most preferably below about 80 ppm. The "ppm" for the catalyst and the catalyst inhibitor described below, refers to the weight of the element referred to and is based upon the weight of the final copolyester product.

The polyester fibers and films of this invention also may contain other conventional additives and ingredients which do not deleteriously affect their end use. For example, additives such as fillers, surface friction modifiers, light and heat stabilizers, extrusion aids, antistatic agents, colorants, dyes, pigments, hydrophobic and hydrophilic enhancers, viscosity modifiers, slip agents, tougheners, adhesion promoters, and the like may be used. Preferably, colorants, sometimes referred to as toners, may be added to impart a desired neutral hue and/or brightness to the resulting copolyester. When colored polyesters are desired, pigments or colorants may be included in the reaction mixture during the reaction of the diol component and the dicarboxylic acid component or they may be melt blended with the preformed polyester. A preferred method of including colorants is to use a colorant having thermally stable organic colored compounds having reactive groups such that the colorant is copolymerized and incorporated into the copolyester to improve the hue of the polyester. For example, colorants such as dyes possessing reactive hydroxyl and/or carboxyl groups, including, but not limited to, blue and red substituted anthraquinones, may be copolymerized into the polymer chain. When dyes are employed as colorants, they may be added to the copolyester reaction process after an ester interchange or direct esterification reaction.

Alternatively, inorganic pigments, such as titanium dioxide and cobalt containing materials, may be added to the reaction. Advantageously when a catalyst material contains cobalt, the cobalt may also act as a colorant. Care must be taken to control the level of cobalt in order to avoid dinginess in the copolyesters of the invention. To control the level of dinginess, cobalt may be employed in an amount ranging up to about 90 ppm.

The inherent viscosity of the polyester for the present invention will generally be in the range of about 0.3 to about 2.0 and is generally determined in a 0.5 wt. % solution in a 60/40 phenol/tetrachloroethane mixture. When making fine denier melt blown or spunbonded fibers, low I.V. polymers having I.V. values of about 0.3 to about 0.6 are preferred. However for the mono- and multifilament fibers, higher I.V. polymers in the range of about 0.45 to about 1.25 are preferred.

Our invention also provides a process for stabilizing polyester fibers comprising: i) melt blending a) a polyester comprising about 60 to 100 mole % of a dicarboxylic acid residue selected from the group consisting of terephthalic acid, naphthalenedicarboxylic acids, cyclohexanedicarboxylic acids, and mixtures thereof; about 50 to 100 mole % of a diol residue selected from the group consisting of 1,3-cyclohexanedimethanol, 1,4-cyclohexanedimethanol, 1,3-propanediol, and mixtures thereof; and b) about 0.05 wt % to about 5 wt %, based on the total weight of the polyester, of an epoxide additive comprising a epoxide compound with at least 2 epoxy groups per molecule; and ii) melt spinning continuous strands of filaments. Up to about 6 wt %, based on the total weight of the polyester, of an antioxidant may be added to the polyester, either during polymerization or by melt-blending the antioxidant into the polyester. The terms "melt spinning" and "extrusion spinning" as used herein mean process wherein a polymer melt is forced under pressure or extruded through a spinnerette or spinning die and quenched to form strands of polymer filaments. Typically, about 0.05 wt % to about 2 wt % of epoxide additive may be used. More preferably, the concentration of epoxide additive is from about 0.1 to about 1 wt %, and most preferably, from about 0.2 to about 0.5 wt %. The first diol residue may comprise about 70 to 100 mole % or from about 90 to 100 mole % of the diol residues. Preferably, the dicarboxylic acid residue of our process comprises from about 95 to 100 mole % terephthalic acid and from about 0 to about 5 mole % isophthalic acid; the diol residue comprises about 100 mole % 1,4-cyclohexanedimethanol; and the epoxy comprises about 0.5 wt % of a polyglycidyl ether of a cresol-formaldehyde novolac resin. More preferably, the dicarboxylic acid residue comprises from about 95 mole % terephthalic acid and about 5 mole % isophthalic, acid. Even more preferably, the epoxy comprises about 0.5 wt % of a polyglycidyl ether of a phenolformaldehyde novolac resin. If an antioxidant is used, it typically comprises about 0.1 to about 2 wt % or, more typically, about 0.2 to about 1 wt % of the total weight of the polyester. Preferably, the antioxidant comprises about 0.5 wt % of a hindered phenol and about 0.5 wt % of a phosphite or phosphonite.

The polyester utilized by our novel process may also comprise a dicarboxylic acid residue comprising about 100 mole % terephthalic acid and a diol residue comprising about 100 mole % 1,4-cyclohexanedimethanol. The polyester is melt blended with about 0.05 wt % to about 5 wt %, based on the total weight of the polyester, of an epoxide additive comprising a epoxide compound with at least 2 epoxy groups per molecule and continuous strands of filaments are melt spun from the blend. Typically, about 0.05 wt % to about 2 wt % of epoxide additive may be used. More preferably, the concentration of epoxide additive is from about 0.1 to about 1 wt %, and most preferably, from about 0.2 to about 0.5 wt %. Preferably the epoxide additive comprises about 0.5 wt % of a polyglycidyl ether of a cresol-formaldehyde novolac resin. Optionally, from 0 wt % to about 6 wt % of an antioxidant based on the total weight of the polyester, may be added to polyester. Preferably, the antioxidant comprises about 0.5 wt % of a hindered phenol and about 0.5 wt % of a phosphite or phosphonite.

The polyester and epoxide additive may be mixed in batch, semicontinuous, or continuous processes as described above. It is preferred to meter in the epoxy component while extruding the polyester in either a single or twin screw extruder. Small scale batches may be readily prepared in any high-intensity mixing devices well-known to those skilled in the art, such as Banbury mixers, prior to melt-spinning fibers. The components preferably may also be blended in solution in an appropriate solvent. Another preferred technique is to prepare a master batch of polyester containing from about 5 to about 30 wt % epoxide additive and subsequently to let this master batch down to desired epoxy concentration in the same or different polyester.

The melt blending method includes blending the polyesters and epoxide additive at a temperature sufficient to melt the polyester. The blend may be cooled and pelletized for further use or the melt blend can be melt spun directly from this molten blend into fiber form. The term "melt" as used herein includes, but is not limited to, merely softening the polyester. For melt mixing methods generally known in the polymers art, see "Mixing and Compounding of Polymers" (I. Manas-Zloczower & Z. Tadmor editors, Carl Hanser Verlag Publisher, 1994, New York, N.Y. ).

Our invention also provides a stabilized polyester film comprising i) a polyester comprising about 60 to 100 mole % of a dicarboxylic acid residue selected from the group consisting of terephthalic acid, naphthalenedicarboxylic acids, cyclohexanedicarboxylic acids, and mixtures thereof; about 50 to 100 mole % of a diol residue selected from the group consisting of 1,3-cyclohexanedimethanol, 1,4-cyclohexanedimethanol, 1,3-propanediol, and mixtures thereof; and ii) about 0.05 wt % to about 5 wt %, based on the total weight of the polyester, of an epoxide additive comprising a epoxide compound with at least 2 epoxy groups per molecule. Typically, the concentration of epoxy compound may be from about 0.1 to about 2 wt %, preferably, from about 0.1 to about 1 wt %, and, more preferably, from about 0.2 to about 0.5 wt %. The first diol residue may comprise about 70 to 100 mole % or from about 90 to 100 mole % of the diol residues. Preferably, the dicarboxylic acid residue of our film comprises from about 90 to 100 mole % terephthalic acid and from about 0 to about 5 mole % isophthalic acid, the diol residue comprises about 100 mole % 1,4-cyclohexanedimethanol, and the epoxy comprises about 0.5 wt % of a polyglycidyl ether of a phenol-formaldehyde novolac resin. More preferably, the dicarboxylic acid residue comprises from about 95 mole % terephthalic acid and about 5 mole % isophthalic acid, and most preferably the dicarboxylic acid residue comprises about 100 mole % terephthalic acid. Optionally, the film may contain from 0 wt % to about 6 wt % of an antioxidant based on the total weight of the polyester. If an antioxidant is used, it typically comprises about 0.1 to about 2 wt % or, more typically, about 0.2 to about 1 wt % of the total weight of the polyester. Preferably, the antioxidant comprises about 0.5 wt % of a hindered phenol and about 0.5 wt % of a phosphite or phosphonite.

According to the invention, our novel polyester film may be produced as a monolayer or multilayer film and in a non-oriented or oriented state. The monolayer film may be produced by conventional extrusion or casting techniques. The multilayered films may be produced by conventional coextrusion, lamination, or the like. The readily crystallizable layer may have a layer of the heat-sealable layer applied to one or both sides. The film may be of any convenient thickness, but total thickness will normally be between about 5 and about 50 mil. Normally, the heat-sealing polyester in multilayered films will account for about 5–50% of the total thickness of the film.

A biaxial film may be obtained by conventional, known methods or methods well known to persons of ordinary skill in the art. For example, it can be obtained by forming an unstretched film and then, biaxially stretching the resulting unstretched film. The unstretched film having an intrinsic viscosity of 0.35 to 0.9 dl/g may be obtained by melt extruding a polyester into a film form, for example, from the melting point temperature of the polyester up to a temperature of about 70° C. above the melting point and solidifying, by quenching, the film. For the purposes of this invention, the melting point is determined by any means known in the art. The preferred method of determining melting point and glass transition temperature is by the differential scanning calorimetry (DSC) well known in the art. The melting point can be specifically defined in this context as the temperature of the highest peak on the endotherm of the plot produced via DSC.

The polyester film of the present invention is usually extruded in a form of a sheet, cooled on a casting drum, and after an amorphous sheet is made, the sheet is stretched and heat set to produce a biaxially stretched film. Preferably, polyester. films of our invention are manufactured by forming a substantially amorphous film from the polyester defined in detail above and, optionally, annealing the film by heating it above its glass transition temperature to effect crystallization of the polyester. The annealing step may be performed by heating the substantially amorphous polyester film at a temperature of at least 80° C. for a period of time sufficient to impart to the resulting article a heat stability (in accordance with ASTM method D1637) of at least 70° C. The substantially amorphous polyester sheet is prepared by extruding or rolling the polyester into a sheet or film and then quenching the extruded or molded article by rapidly cooling it.

The rapid cooling can be accomplished by any method which provides for the removal of heat from the molten polyester at a rate sufficient to prevent significant crystallization of the polyester. The required heat removal can be accomplished by contacting the extruded or molded polyester melt with a cooled or chilled roll or mold, for example a roll or mold maintained at or below about 15° C. Alternatively, the polyester melt can be contacted with a cold gas to accomplish the necessary rapid cooling. The rapid cooling prevents significant crystallization and thereby permits the formation of an article having good clarity. Thicker articles require a greater heat transfer rate and, consequently, a more rigorous means of cooling to give a clear, substantially amorphous article. The rapid cooling may be effected simultaneously with a shaping step as occurs, for example, when an extruded cylinder of the polyester is enveloped by a chilled mold and the molten polyester is forced outwardly into the mold by means of a gas at superatmospheric pressure.

The unstretched film can be formed into a biaxially oriented film in accordance with any of biaxially oriented film production methods which have been accumulated heretofore. For example, the unstretched film is stretched to 2.5 to 7.0 times in one direction (longitudinal or transverse direction) at a temperature of Tg−10° C. to about Tg+70° C. ("Tg" as used herein refers to the glass transition temperature of a polyester in ° C.) and then to 2.5 to 7.0 times in the direction perpendicular to the above direction (transverse direction when first stretched in the longitudinal direction) at the glass transistion temperature up to a temperature of Tg+70° C. In this case, the area stretch ratio is preferably set to 9 to 32 times, more preferably 12 to 32 times. The stretching means may be either simultaneous biaxial stretching or sequential biaxial stretching. Further, the biaxially oriented film can be heat-set at a temperature of Tg+70° C. to Tm.

Alternatively, polyester film may be produced as heat-shrinkable films and sheet. Heat-shrinkable plastic films are used for labelling, protection, parceling, and wrapping of glass, metal, ceramic and plastic bottles, boxes, cans, pipes, and wood. For example, heat-shrinkable films are widely used as tamper evident labels on food and pharmaceutical products, as primary labels on plastic containers such as soft drink bottles, and protective wraps for medicines and dry cell batteries.

The present invention is illustrated by the following examples.

EXAMPLES

Testing Procedures

The following polyester polymers were used to prepare fiber samples:

| Polymer | Monomer Components (percentages as mole %) |
|---|---|
| PET | 100% terephthalic acid, 100% ethylene glycol |
| PETG | 100% terephthalic acid, 31%, ethylene glycol, 69% 1,4-cyclohexanedimethanol |
| PCT | 100% terephthalic acid, 100% 1,4-cyclohexanedimethanol |
| PCTA | 95% moleterephthalic acid, 5% isophthalic acid, 100% 1,4-cyclohexanedimethanol |
| PCTG | 100% terephthalic acid, 81% 1,4-cyclohexanedimethanol, 19% ethylene glycol |

All fibers were tested for single filament tensile properties (Instron Test Equipment), strand (10 filaments) tensile properties, strand tensile properties after exposure to dry heat at 401° F. (205° C.), except for PETG samples that were tested at 194° F. (90° C.). Seven samples of each fiber sample were placed in an oven at the appropriate temperature setting. Samples were removed after 1, 2, 4, 6, 8, 10, and 24 hours. Strand tensile properties were determined on each of these aged samples.

For determination of moist heat stability, strand samples were also exposed in an autoclave containing steam at 298° F. (148° C.), except PETG samples that were tested at 259° F. (126° C.). Two samples of each fiber sample were exposed to these conditions for 12 and 24 hours. Treated samples were tested for tensile properties.

Example 1
PCT Fibers Containing Epoxy Compounds

PCT Polyester (I.V. 0.77 dl/g) was compounded at 572° F. (300° C.) on a 40 mm twin screw extruder With 2.0% of the epoxide additive (Dow XD. 9053.03 Epoxy, referred to as Epoxy D in Table 1). Salt and pepper blends with additional virgin resins were then prepared to contain 0, 0.1, 0.2, 0.5, 1.0 and 2.0 weight % epoxy compound. These blends were dried at 248° F. (120° C.) for 4 hours and then were melt extruded into multifilament fibers using a spinnerette having 10 holes (0.3 mm round orifices), at 590° F. (310° C.), at a take-up speed of 500 meters/minute and an extrusion rate of 1 pound an hour. These as-spun fibers were about 10 denier/filament (d/f). The as-spun fibers were subsequently drawn through a chamber heated to 284–302° F.(140–150° C.) using a single-stage drafting process to provide a 3:1 draft ratio and were relaxed heatset at 180° C. The fibers were wound on packages and had a final d/f of about 3.5 (for PCT polyester, fiber heatsetting temperatures up to 205 C are practiced). Results of Instron tensile measurements are shown in Table 1 and indicate that inclusion of the epoxide additive improves the dry heat stability of PCT fibers and that there is an optimum level. The hydrolytic stability of the fibers was considered good at all levels of epoxide additive.

TABLE 1

Tenacity of Stabilized PCT Polyester Fibers Before and After Accelerated Aging

| Sample | A | B | C | D | E | F |
|---|---|---|---|---|---|---|
| Wt % Epoxy D | 0.0 | 0.1 | 0.2 | 0.5 | 1.0 | 2.0 |
| As Spun PCT Filament | 2.7 | 3.0 | 2.8 | 2.9 | 2.7 | 2.4 |
| As 10-fil Spun PCT Strands | 2.5 | 2.6 | 2.6 | 2.7 | 2.4 | 2.4 |
| Aged (Temp./Time) | Strand Dry-Heat Stability (Tenacity, g/denier) | | | | | |
| 401° F. (205° C.)/1 hour | 2.1 | 2.5 | 2.5 | 2.4 | 2.3 | 1.8 |
| 401° F. (205° C.)/2 hour | 1.8 | 2.2 | 2.4 | 2.5 | 2.3 | 1.5 |
| 401° F. (205° C.)/4 hour | 1.3 | 2.1 | 2.2 | 2.6 | 2.3 | 1.8 |
| 401° F. (205° C.)/6 hour | 0.9 | 1.5 | 1.8 | 2.0 | 2.2 | 1.7 |
| 401° F. (205° C.)/8 hour | 0.6 | 1.7 | 1.5 | 2.3 | 2.0 | 1.7 |
| 401° F. (205° C.)/10 hour | 0.7 | 0.8 | 1.5 | 1.8 | 1.8 | 1.5 |
| 401° F. (205° C.)/24 hour | 0.4 | 0.8 | 0.7 | 1.0 | 0.8 | 0.8 |
| | Strand Moist-Heat Stability (Tenacity, g/denier) | | | | | |
| 298° F. (148° C.)/12 hr Wet | 1.9 | 2.3 | 2.3 | 2.5 | 2.3 | 2.2 |
| 298° F. (148° C.)/24 hr Wet | 1.4 | 2.2 | 2.0 | 2.3 | 2.1 | 2.1 |

Example 2
Polyester Fibers Containing Various Levels of Epoxy Compound (Table 2)

The following pellet samples of polyesters were compounded on a 40 mm twin screw extruder at 572° F. (300° C.) to contain selected epoxy compounds. These were then extruded in a second step into fibers and tested after aging under dry and wet conditions as described above. Pellet samples AA and BB were dried at 248° F. (120° C.) for 4 hours and then were melt extruded using a melt temperature of 536° F. (280° C.) as described in Example 1 to provide multifilament fibers with a denier of about 12 d/f. The as-spun fibers were subsequently drawn in a 158° F. (70° C.) water bath and then through a chamber heated to 302–320° F. (150–160° C.) (2-stage drafting process) to provide a 4:1 draft ratio. The fibers were relaxed heatset at 150° C., wound on packages, and had a final denier of about 3.8 d/f.

Pellet samples CC and DD were dried at 122° F. (50° C.) for 4 hours and then extruded into multifilament fibers of about 10 d/f at a melt temperature of 509° F. (265° C.) using the procedure described in Example 1. The as-spun fibers were subsequently drawn in a 158° F. (70° C.) water bath, using a two-stage drafting process to provide a 3.25:1 draft ratio. The fibers were further drafted through a chamber heated to 194–212° F. (90–100° C.) and relaxed heatset at 150° C. The fibers were wound on packages and had a final denier of about 3.5 d/f.

Pellet samples EE and FF were dried at 248° F. (120° C.) for 4 hours and then melt spun at a melt temperature of 554° F. (290° C.) using the process described in Example 1 to provide multifilament fibers of 9 d/f. The as-spun fibers were subsequently drawn through a chamber heated to 302–320° F. (150–160° C.) (single stage drafting process) to provide a 3.2:1 draft ratio and relaxed heatset at 150° C. The fibers were wound on packages and had a final denier of about 3 d/f.

Pellet samples GG and HH were dried at 248° F. (120° C.) for 4 hours and then were melt extruded at a melt temperature of 590° F. (310° C.) using the procedure described in Example 1 to provide multifilament fibers of about 9 d/f. The as-spun fibers were subsequently drawn through a chamber heated to 302–320° F. (150–160° C.), using a single stage drafting process, to provide a 3.2:1 draft ratio and relaxed heatset at 150° C. The fibers were wound onto packages and had a final denier of about 3.0 d/f.

Pellet samples II, JJ, KK, and LL were dried at 248° F. (120° C.) for 4 hours and then were melt extruded at a melt temperature of 590° F. (310° C.) using the process described in Example 1 to provide multifilament fibers having a denier of about 9 d/f. The as-spun fibers were subsequently drawn through a chamber heated to 302–320° F. (150–160° C.) using a single stage drafting process to provide a 3.2:1 draft ratio and relaxed heatset at 150° C. The fibers were wound onto packages and had a final denier of about 3 d/f.

This example shows that the dry oven aging performance of the fibers is improved with epoxy addition in the CHDM polymers (PCT, PCTG, and PCTA) whereas no corresponding improvement is observed for PET. The copolyesters show a gradual transition with CHDM content. Hydrolytic stability is given by the autoclaving data, which shows the superiority of the CHDM polyesters, which is not reduced by the epoxy. Epoxy A has similar epoxy equivalent weight to Epoxy D in Example 1 whereas the higher level of Epoxy B must be used to achieve an equivalent concentration of functional groups.

TABLE 2

Tenacity (g/denier) of Various Polyester Fibers with Epoxy, before and after Accelerated Aging

| Sample | AA | BB | CC | DD | EE | FF | GG | HH | II | JJ | KK | LL |
|---|---|---|---|---|---|---|---|---|---|---|---|---|
| Base Resin | PET | PET | PETG | PETG | PCTG | PCTG | PCTA | PCTA | PCT | PCT | PCT | PCT |
| Epoxide Additive (wt %) | — | 0.5 A | — | 0.5 A | — | 0.5 A | — | 0.5 A | — | 0.5 A | 0.5 B | 1.25 B |
| As Spun Filament | 5.8 | 4.3 | 4.5 | 3.9 | 4.3 | 3.5 | 4.0 | 3.6 | 3.8 | 3.6 | 3.5 | 3.4 |
| As Spun Strand | 4.8 | 3.4 | 2.6 | 2.5 | 3.3 | 3.0 | 2.5 | 3.2 | 3.2 | 3.3 | 3.0 | 2.9 |

TABLE 2-continued

Tenacity (g/denier) of Various Polyester Fibers with Epoxy, before and after Accelerated Aging

| Sample | AA | BB | CC | DD | EE | FF | GG | HH | II | JJ | KK | LL |
|---|---|---|---|---|---|---|---|---|---|---|---|---|
| Aged (Dry) | Dry-Heat Stability (Strand Tenacity in g/denier) | | | | | | | | | | | |
| Oven Temp. °F. (°C.) | 401 (205) | 401 (205) | 194 (90) | 194 (90) | 401 (205) | 401 (205) | 401 (205) | 401 (205) | 401 (205) | 401 (205) | 401 (205) | 401 (205) |
| Time | | | | | | | | | | | | |
| 1 Hour | 4.7 | 4.4 | 2.7 | 2.6 | 1.5 | 2.5 | 2.8 | 3.0 | 2.9 | 3.2 | 3.2 | 3.0 |
| 2 Hours | 4.8 | 3.6 | 2.5 | 2.7 | 0.5 | 2.7 | 2.5 | 3.0 | 2.5 | 3.2 | 3.2 | 3.0 |
| 4 Hours | 5.0 | 3.3 | 2.7 | 2.5 | Fail | 1.3 | 2.0 | 2.8 | 2.2 | 2.9 | 2.6 | 3.2 |
| 6 Hours | 4.0 | 3.2 | 3.0 | 2.8 | Fail | 0.9 | 1.8 | 2.7 | 2.6 | 2.5 | 2.9 | 2.9 |
| 8 Hours | 3.8 | 3.3 | 2.9 | 2.7 | Fail | 0.9 | 1.6 | 2.4 | 1.9 | 2.5 | 2.9 | 2.8 |
| 10 Hours | 5.3 | 3.1 | 2.9 | 2.7 | Fail | 0.3 | 1.4 | 2.5 | 1.5 | 2.3 | 2.6 | 2.5 |
| 24 Hours | 3.0 | 2.6 | 3.0 | 2.6 | Fail | Fail | 0.8 | 0.7 | 1.4 | 1.7 | 1.8 | 2.0 |
| Aged (Wet) | Moist-Heat Stability (Strand Tenacity in g/denier) | | | | | | | | | | | |
| Autoclave Temp. °F. (°C.) | 298 (148) | 298 (148) | 259 (126) | 259 (126) | 298 (148) | 298 (148) | 298 (148) | 298 (148) | 298 (148) | 298 (148) | 298 (148) | 298 (148) |
| Time | | | | | | | | | | | | |
| 12 Hours | 3.4 | 2.3 | Fail | Fail | 2.9 | 1.9 | 3.2 | 2.9 | 3.1 | 3.0 | 3.1 | 2.5 |
| 24 Hours | 1.6 | 0.5 | Fail | Fail | 1.1 | Fail | 3.0 | 2.7 | 2.7 | 2.8 | 2.8 | 2.8 |

We claim:

1. A polyester fiber comprising:

i) dicarboxylic acid residues comprising about 60 to 100 mole % of a first dicarboxylic acid residue selected from the group consisting of terephthalic acid, naphthalene-dicarboxylic acids, cyclohexanedicarboxylic acids, and mixtures thereof; and from 0 to about 40% of a second dicarboxylic acid residue selected from the group consisting of aromatic dicarboxylic acids containing from about 8 to about 16 carbon atoms, aliphatic dicarboxylic acids containing from about 4 to about 16 carbon atoms, cycloaliphatic dicarboxylic acids containing from about 6 to about 16 carbon atoms, and mixtures thereof;

ii) diol residues comprising about 50 to 100 mole % of a first diol residue selected from the group consisting of 1,3-cyclohexanedimethanol, 1,4-cyclohexanedimethanol, 1,3-propanediol, and mixtures thereof; and from 0 to about 50 mole % of a second diol residue selected from the group consisting of aliphatic diols containing from 2 to about 16 carbon atoms, cycloaliphatic diols containing from about 6 to about 16 carbon atoms, and mixtures thereof; and iii) about 0.05 weight % (wt %) to about 5 wt %, based on the total weight of said polyester, of an epoxide additive comprising an epoxide compound with at least 2 epoxy groups per molecule.

2. The polyester fiber according to claim 1 further comprising 0 wt % to about 6 wt % of an antioxidant based on the total weight of said polyester.

3. The polyester fiber according to claim 2 wherein said naphthalenedicarboxylic acids are selected from the group consisting of 1,2-naphthalenedicarboxylic acid, 1,3-naphthalenedicarboxylic acid, 1,4-naphthalenedicarboxylic acid, 1,5-naphthalenedicarboxylic acid, 1,6-naphthalenedicarboxylic acid, 2,4-naphthalenedicarboxylic acid, 2,5-naphthalenedicarboxylic acid, 2,6-naphthalenedicarboxylic acid, 2,7-naphthalenedicarboxylic acid, 2,8-naphthalenedicarboxylic acid, and mixtures thereof.

4. The polyester fiber according to claim 3 wherein said cyclohexanedicarboxylic acids are selected from the group consisting of 1,2-cyclohexanedicarboxylic acid, 1,3-cyclohexanedicarboxylic acid, 1,4-cyclohexanedicarboxylic acid, and mixtures thereof.

5. The polyester fiber according to claim 4 wherein said second dicarboxylic acid residue is selected from the group consisting of fumaric, succinic, adipic, glutaric, azelaic, sebacic, isophthalic, resorcinoldiacetic, diglycolic, 4,4'-oxybis[benzoic], biphenyldicarboxylic, 4,4'-methylenedibenzoic, trans-4,4'-stilbenedicarboxylic, and sulfoisophthalic acids.

6. The polyester fiber according to claim 5 wherein said second diol residue is selected from the group consisting of ethylene glycol, neopentyl glycol, 1,2-propanediol, 1,3-propanediol, 1,4-butanediol, 1,5-pentanediol, 1,6-hexanediol, 2,2-dimethyl-1,3-propanediol, 1,8-octanediol, 1,10-decanediol, diethylene glycol, and 2,2,4,4 tetramethyl-1,3-cyclobutanediol.

7. The polyester fiber according to claim 6 wherein said epoxide additive is selected from the group consisting of aromatic hydrocarbon monomers having at least 2 epoxide groups, oligomers and polymers of from 2 to about 100 monomer units and having at least 2 epoxide groups, and mixtures thereof.

8. The polyester fiber according to claim 7 wherein said epoxide additive comprises one or more compounds of the formulas (I–III):

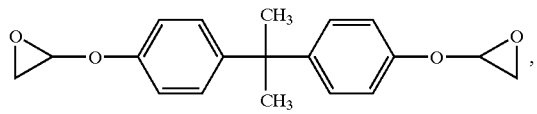

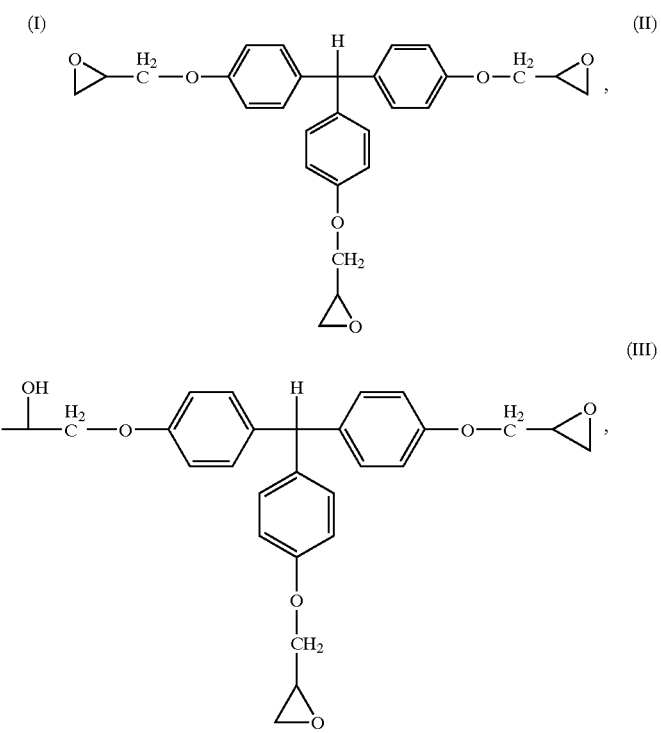

oligomers thereof, or polymers thereof.

9. The polyester fiber according to claim 8 wherein said epoxide additive comprises oligomers or polymers of the formula (IV):

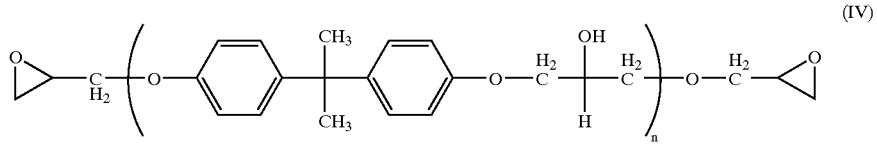

wherein n is 2 to about 100.

10. The polyester fiber according to claim 7 wherein said epoxide additive comprises a polyglycidyl ether of a cresol-formaldehyde novolac resin, tris(4-gylcidyl-oxypheny) methane, oligomers thereof, or polymers thereof.

11. A polyester fiber comprising:
   i) dicarboxylic acid residues comprising about 60 to 100 mole % of terephthalic acid and from 0 to about 40% of isophthalic acid;
   ii) diol residues comprising about 50 to 100 mole % of a first diol residue comprising 1,4-cyclohexanedimethanol; and from 0 to about 50 mole % of a second diol residue comprising aliphatic diols containing from 2 to about 16 carbon atoms; and
   iii) about 0.05 wt % to about 2 wt %, based on the total weight of said polyester, of an epoxide additive comprising an epoxide compound with at least 2 epoxy groups per molecule.

12. The polyester fiber according to claim 11 and wherein said polyester has a glass transition temperature greater than or equal to 85° C.

13. The polyester fiber according to claim 11 further comprising 0 wt % to about 6 wt % of an antioxidant based on the total weight of said polyester.

14. The polyester fiber according to claim 13 wherein said dicarboxylic acid residues comprise from about 90 to 100 mole % terephthalic acid and from about 0 to about 10 mole % isophthalic acid; said diol residue comprises about 100 mole % 1,4-cyclohexanedimethanol; and said epoxide additive comprises about 0.5 wt % of a polyglycidyl ether of a cresol-formaldehyde novolac resin.

15. The polyester fiber according to claim 14 wherein said dicarboxylic acid residue comprises about 95 mole % terephthalic acid and about 5 mole % isophthalic acid.

16. The polyester fiber according to claim 15 wherein said antioxidant comprises about 0.5 wt % of a hindered phenol and about 0.5 wt % of a phosphite or phosphonite.

17. The polyester fiber according to claim 14 wherein said dicarboxylic acid residue comprises about 100 mole % terephthalic acid.

18. The polyester fiber according to claim 17 wherein said antioxidant comprises about 0.5 wt % of a hindered phenol and about 0.5 wt % of a phosphite or phosphonite.

19. The polyester fiber according to claim 14 wherein said fiber is a staple, monofilament, multifilament, or multicomponent fiber having a shaped or round cross-section.

20. The polyester fiber according to claim 14 wherein said fiber is a yarn, melt-blown fabric, spunbond fabric, multilayer fabric, laminate, or composite.

21. Process for stabilizing polyester fibers comprising:
   i) melt blending a) a polyester comprising about 60 to 100 mole % of a dicarboxylic acid residue selected from the group consisting of terephthalic acid, naphthalenedicarboxylic acid, cyclohexanedicarboxylic acids, and mixtures thereof; about 50 to 100 mole % of a diol residue selected from the group consisting of 1,3-cyclohexanedimethanol, 1,4-cyclohexanedimethanol, 1,3-propanediol, and mixtures thereof; and b) about 0.05 wt % to about 5 wt %, based on the total weight of said polyester, of an epoxide additive comprising an epoxide compound with at least 2 epoxy groups per molecule; and ii) melt spinning continuous strands of filaments.

22. The process according to claim 21 wherein said polyester further comprises 0 wt % to about 6 wt % of an antioxidant based on the total weight of the polyester.

23. The process according to claim 22 wherein said dicarboxylic acid residue comprises from about 90 to 100 mole % terephthalic acid and from about 0 to about 10 mole % isophthalic acid; said diol residue comprises about 100 mole % 1,4-cyclohexanedimethanol; and said epoxide additive comprises about 0.5 wt % of a polyglycidyl ether of a cresol-formaldehyde novolac resin.

24. The process according to claim 23 wherein said dicarboxylic acid residue comprises from about 95 mole % terephthalic acid and about 5 mole % isophthalic acid.

25. The polyester fiber according to claim 23 wherein said dicarboxylic acid residue comprises about 100 mole % terephthalic acid.

26. The process according to any one of claim 24 or 25 wherein said antioxidant comprises about 0.5 wt % of a hindered phenol and about 0.5 wt % of a phosphite or phosphonite.

27. A stabilized polyester film comprising:
 i) a polyester comprising about 60 to 100 mole % of a dicarboxylic acid residue selected from the group consisting of terephthalic acid, naphthalenedicarboxylic acids, cyclohexanedicarboxylic acids, and mixtures thereof; about 50 to 100 mole % of a diol residue selected from the group consisting of 1,3-cyclohexanedimethanol, 1,4-cyclohexanedimethanol, 1,3-propanediol, and mixtures thereof;
 ii) about 0.05 weight % (wt %) to about 5 wt %, based on the total weight of said polyester, of an epoxide additive comprising a epoxide compound with at least 2 epoxy groups per molecule.

28. The polyester film according to claim 27 further comprising from 0 wt % to about 6 wt % of an antioxidant based on the total weight of the polyester.

29. The polyester film according to claim 28 wherein said dicarboxylic acid residue comprises from about 95 to 100 mole % terephthalic acid and from about 0 to about 5 mole % isophthalic acid; said diol residue comprises about 100 mole % 1,4-cyclohexanedimethanol; and said epoxide additive comprises about 0.5 wt % of a polyglycidyl ether of a cresol-formaldehyde novolac resin.

30. The polyester film according to claim 29 wherein said dicarboxylic acid residue comprises about 95 mole % terephthalic acid and about S mole % isophthalic acid.

31. The polyester film according to claim 29 wherein said dicarboxylic acid residue comprises about 100 mole % terephthalic acid.

* * * * *

UNITED STATES PATENT AND TRADEMARK OFFICE
CERTIFICATE OF CORRECTION

PATENT NO. : 6,818,293 B1
DATED : November 16, 2004
INVENTOR(S) : Keep et al.

It is certified that error appears in the above-identified patent and that said Letters Patent is hereby corrected as shown below:

Column 19,
Line 38, reads "naphthalene-dicarboxylic acids, cyclohexanedicar-" but should read
-- naphthalenedicarboxylic acids, cyclohexanedicar- --

Column 21,
Line 48, reads "formaldehyde novolac resin, tris(4-gylcidyl-oxypheny)" but should read
-- formaldehyde novolac resin, tris(4-gylcidyloxypheny) --

Column 23,
Line 28, reads "26. The process according to any one of claim 24 or 25" but should read
-- 26. The process according to any one of claims 24 or 25 --

Column 24,
Line 26, reads "terephthalic acid and about S mole % isophthalic acid" but should read
-- terephthalic acid and about 5 mole % isophthalic acid --

Signed and Sealed this

Fifth Day of April, 2005

JON W. DUDAS
*Director of the United States Patent and Trademark Office*